3,160,629
PROCESS FOR THE PREPARATION OF 1,2,4-BENZO-
THIADIAZINE-1,1-DIOXIDE DERIVATIVES
Frederick C. Novello, Berwyn, Pa., assignor to Merck &
Co., Inc., Rahway, N.J., a corporation of New Jersey
No Drawing. Filed Apr. 7, 1961, Ser. No. 101,331
4 Claims. (Cl. 260—243)

This invention is concerned with a novel process for the preparation of 1,2,4-benzothiadiazine-1,1-dioxide. In particular, this invention relates to the preparation of 1,2,4-benzothiadiazine-1,1-dioxide compounds by oxidation of a 3,4-dihydro-1,2,4-benzothiadiazine-1,1-dioxide.

It was surprisingly found as a feature of this invention that high yields of 1,2,4-benzothiadiazine-1,1-dioxide compounds can be obtained by oxidation of a 3,4-dihydro-1,2,4-benzothiadiazine. In accordance with the process of this invention, the 3,4-dihydro-1,2,4-benzothiadiazine is oxidized in the presence of an alkali metal permanganate such as sodium or potassium permanganate or other oxidizing agents as chromic acid, sodium or potassium chromate or dichromate and the like to give the dehydrogenated compound, 1,2,4-benzothiadiazine-1,1-dioxide.

The process of this invention can be employed to oxidize any 3,4-dihydro-1,2,4-benzothiadiazine-1,1-dioxide compound whether unsubstituted or having one or more substituents attached to the heterocyclic moiety, the benzenoid moiety or both portions of the benzothiadiazine ring structure. Of course should the substituents themselves be of a type which would also undergo oxidation during the process, this would not at all interfere with the dehydrogenation of the heterocyclic portion of the benzothiadiazine nucleus and both the nucleus and the substituent group will undergo oxidation.

Oxidation advantageously is carried out in the presence of a solvent; water being quite satisfactory for this purpose. The reaction medium can be neutral or a small amount of acid or base may be present in the reaction medium depending upon the particular oxidizing agent used. For all practical purposes, oxidation can be carried out at room temperature although the reaction will proceed quite satisfactorily if moderately heated, for example on the steam bath.

Following oxidation, the reaction mixture can be worked up in any of the conventional ways to destroy or remove any excess oxidizing agent which may be present, such as by the addition of alcohol. The dehydrogenated product then can be separated from the filtrate by acidification to precipitate the desired 1,2,4-benzothiadiazine-1,1-dioxide compound.

The process of this invention has been found to be especially well suited to the preparation of 1,2,4-benzothiadiazine-1,1-dioxide compounds which contain a sulfamyl substituent attached to the benzenoid moiety of the nucleus and which additionally contains at least one other substituent such as a halogen, a lower alkyl, lower alkoxy, nitro or protected amino or similar radical attached to the benzenoid portion of the nucleus. Substituents also can be attached to the heterocyclic moiety of the starting material provided at least one hydrogen atom is attached to at least one of the nitrogen atoms in the ring and at least one hydrogen is attached to the 3-position carbon in the heterocyclic portion of the nucleus.

The 1,2,4-benzothiadiazine-1,1-dioxide compounds prepared by the novel process of this invention which contain a sulfamyl substituent and at least one other substituent attached to the benzenoid portion of the structure are useful, inter alia, as diuretic and/or saluretic agents. Among this group of compounds, those possessing an especially high order of effectiveness as diuretic agents are compounds having the structure

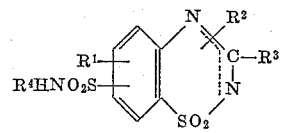

wherein $R^1$ represents halogen or a halogen-like radical as chlorine, bromine, fluorine, trihalomethyl or trifluoromethyl, trichloromethyl and the like, a lower alkyl radical advantageously having from 1 to 5 carbon atoms, a lower alkoxy radical advantageously having from 1 to 5 carbon atoms, nitro, a protected amino or the amino group; $R^2$ is attached to either the 2- or 4-position nitrogen and is hydrogen or a lower alkyl radical having advantageously from 1 to 5 carbon atoms; $R^3$ is hydrogen, an alkyl radical either unsubstituted or substituted as a halo-alkyl, or it can be a phenyl or a benzyl or other desired radical; and $R^4$ represents hydrogen or a lower alkyl radical advantageously having from 1 to 5 carbon atoms which can be substituted or unsubstituted.

While the foregoing structure illustrates a group of compounds which can be prepared by the process of this invention, the novel process described herein can be employed to oxidize any 3,4-dihydro-1,2,4-benzothiadiazine-1,1-dioxide to give the dehydrated compound, 1,2,4-benzothiadiazine-1,1-dioxide.

The process of this invention is more fully described in the following examples. It is to be understood, however, that the examples are illustrative of the various compounds that can be prepared by the process of this invention and of the various conditions under which the oxidation can be successfully carried out, and they are not to be construed as limiting the invention to the preparation of the particular compounds specifically described or to the particular conditions employed.

EXAMPLE 1

Oxidation of 6-Chloro-7-Sulfamyl-3,4-Dihydro-1,2,4-Benzothiadiazine-1,1-Dioxide to 6-Chloro-7-Sulfamyl-1,2,4-Benzothiadiazine-1,1-Dioxide Potassium permanganate (3.75 g.) is added portionwise with stirring over 10 minutes to a solution of 8.9 g. (0.03 mole) of 6-chloro-7-sulfamyl-3,4-dihydro-1,2,4-benzothiadiazine-1,1-dioxide in 150 ml. of water and 10 ml. of 20% sodium hydroxide. The solution is stirred at room temperature for 15 minutes and then is warmed on the steam bath for 5 minutes. Excess permanganate is destroyed by addition of 2 to 3 ml. of ethanol. Upon filtration, acidification of the filtrate gives 7.4 g. (84%) of 6-chloro-7-sulfamyl-1,2,4-benzothiadiazine-1,1-dioxide, M.P. 337° C.

EXAMPLE 2

Oxidation of 6-Methyl-7-Sulfamyl-3,4-Dihydro-1,2,4-Benzothiadiazine - 1,1 - Dioxide To Give 6 - Methyl - 7-Sulfamyl-1,2,4-Benzothiadiazine-1,1-Dioxide By replacing the dihydro compound employed in Example 1 by an equimolecular quantity of 6-methyl-7-sulfamyl - 3,4 - dihydro - 1,2,4 - benzothiadiazine - 1,1 - dioxide, and following substantially the same procedure described in Example 1, there is obtained 6-methyl-7-sulfamyl - 1,2,4 - benzothiadiazine - 1,1 - dioxide, M.P. 345° C.

EXAMPLE 3

*Oxidation of 6-Trifluoromethyl-7-Sulfamyl-3,4-Dihydro-1,2,4 - Benzothiadiazine - 1,1 - Dioxide to 6 - Trifluoromethyl - 7 - Sulfamyl - 1,2,4 - Benzothiadiazine - 1,1 - Dioxide*

Sodium permanganate (3.75 g.) is added portionwise with stirring over 10 minutes to a solution of 6-trifluoromethyl - 7 - sulfamyl - 3,4 - dihydro - 1,2,4 - benzothiadiazine-1,1-dioxide (0.03 mole) in 125 ml. of acetone. The solution is stirred at room temperature for about 30 minutes, excess permanganate is destroyed by addition of a small amount of ethanol and the product obtained from the filtrate by acidification to give 6-trifluoromethyl-7-sulfamyl-1,2,4-benzothiadiazine-1,1-dioxide.

EXAMPLE 4

*Oxidation of 6-Bromo-7-Sulfamyl-3,4-Dihydro-1,2,4-Benzothiadiazine - 1,1 - Dioxide To Give 6 - Bromo - 7- Sulfamyl-1,2,4-Benzothiadiazine-1,1-Dioxide*

Chromic acid ($CrO_3$) (3 g.) is added portionwise with stirring over 10 minutes to a solution of 6-bromo-7-sulfamyl - 3,4 - dihydro - 1,2,4 - benzothiadiazine - 1,1 - dioxide (0.03 mole) in 150 ml. of acetic acid. The solution is stirred at room temperature for about 1 hour and then heated on the steam bath for about 10 minutes. The reaction mixture is poured into water to precipitate 6 - bromo - 7 - sulfamyl - 1,2,4 - benzothiadiazine - 1,1-dioxide.

The above procedure can be followed replacing the chromic acid by sodium or potassium chromate or dichromate to give the same end product.

EXAMPLES 5 THROUGH 13

By replacing the 6-chloro-7-sulfamyl-3,4-dihydro-1,2,4-benzothiadiazine-1,1-dioxide employed in Example 1, by an equimolecular quantity of one of the following compounds:

Ex. No.:
- (5) 3-n-propyl-6-chloro-7-sulfamyl-3,4-dihydro-1,2,4-benzothiadiazine-1,1-dioxide,
- (6) 6-nitro-7-sulfamyl-3,4-dihydro-1,2,4-benzothiadiazine-1,1-dioxide,
- (7) 6-methoxy-7-sulfamyl-3,4-dihydro-1,2,4-benzothiadiazine-1,1-dioxide,
- (8) 6-chloro-7-methylsulfamyl-3,4-dihydro-1,2,4-benzothiadiazine-1,1-dioxide,
- (9) 2-methyl-6-chloro-7-sulfamyl-3,4-dihydro-1,2,4-benzothiadiazine-1,1-dioxide,
- (10) 7-sulfamyl-3,4-dihydro-1,2,4-benzothiadiazine-1,1-dioxide,
- (11) 5-methyl-6-chloro-7-sulfamyl-3,4-dihydro-1,2,4-benzothiadiazine-1,1-dioxide,
- (12) 6-fluoro-7-sulfamyl-3,4-dihydro-1,2,4-benzothiadiazine-1,1-dioxide,
- (13) 3,4-dihydro-1,2,4-benzothiadiazine-1,1-dioxide, and following substantially the same procedure described in Example 1, there is obtained, respectively, the following dehydrogenated compounds:

Ex. No.:
- (5) 3-n-propyl-6-chloro-7-sulfamyl-1,2,4-benzothiadiazine-1,1-dioxide,
- (6) 6-nitro-7-sulfamyl-1,2,4-benzothiadiazine-1,1-dioxide,
- (7) 6-methoxy-7-sulfamyl-1,2,4-benzothiadiazine-1,1-dioxide,
- (8) 6-chloro-7-methylsulfamyl-1,2,4-benzothiadiazine-1,1-dioxide,
- (9) 2-methyl-6-chloro-7-sulfamyl-1,2,4-benzothiadiazine-1,1-dioxide,
- (10) 7-sulfamyl-1,2,4-benzothiadiazine-1,1-dioxide,
- (11) 5-methyl-6-chloro-7-sulfamyl-1,2,4-benzothiadiazine-1,1-dioxide,
- (12) 6-fluoro-7-sulfamyl-1,2,4-benzothiadiazine-1,1-dioxide,
- (13) 1,2,4-benzothiadiazine-1,1-dioxide.

While the above examples illustrate specific conditions for the oxidation of 3,4-dihydro-1,2,4-benzothiadiazine-1,1-dioxide compounds to give the dehydrogenated derivatives thereof, it is to be understood modifications can be made in the reaction conditions in the examples without departing from the scope of the invention as defined by the appended claims.

What is claimed is:

1. A process wherein 7-sulfamyl-3,4-dihydro-1,2,4-benzothiadiazine-1,1-dioxide compounds having at least one other substituent selected from the group consisting of halogen, lower alkyl, lower alkoxy and nitro attached to the benzenoid moiety is oxidized in the presence of a solvent and in the presence of alkali metal permanganate to give the corresponding dehydrogenated compound.

2. A process wherein 6-chloro-7-sulfamyl-3,4-dihydro-1,2,4-benzothiadiazine-1,1-dioxide is oxidized in the presence of a solvent and in the presence of potassium permanganate to give 6-chloro-7-sulfamyl-1,2,4-benzothiadiazine-1,1-dioxide.

3. A process wherein 6-trifluoromethyl-7-sulfamyl-3,4-dihydro - 1,2,4 - benzothiadiazine - 1,1 - dioxide is oxidized in the presence of a solvent and in the presence of potassium permanganate to give 6-trifluoromethyl-7-sulfamyl-1,2,4-benzothiadiazine-1,1-dioxide.

4. A process wherein 7-sulfamyl-3,4-dihydro-1,2,4-benzothiadiazine-1,1-dioxide compounds having at least one other substituent selected from the group consisting of halogen, lower alkyl, lower alkoxy and nitro attached to the benzenoid moiety is oxidized in the presence of a solvent and in the presence of an oxidizing agent selected from the group consisting of alkali metal permanganate, chromic acid, an alkali metal chromate and an alkali metal dichromate to give the corresponding dehydrogenated compound.

References Cited in the file of this patent

Novello et al.; Jour. Org. Chemistry, pages 976–981 (June 1960).